(12) United States Patent
Schütt

(10) Patent No.: US 6,464,285 B1
(45) Date of Patent: Oct. 15, 2002

(54) CONVERTIBLE TOP OF A MOTOR VEHICLE

(75) Inventor: Thomas Schütt, Furstenfeldbruck (DE)

(73) Assignee: Webasto Vehicle Systems International GmbH, Stockdorf (DE)

(*) Notice: Subject to any disclaimer, the term of this patent is extended or adjusted under 35 U.S.C. 154(b) by 0 days.

(21) Appl. No.: 09/718,386

(22) Filed: Nov. 24, 2000

(30) Foreign Application Priority Data

Nov. 23, 1999 (DE) .......................... 199 56 330

(51) Int. Cl.$^7$ .............. B60J 1/00; B60J 1/18; B60J 7/00
(52) U.S. Cl. ............ 296/107.07; 276/201; 276/79; 276/146.14; 276/145
(58) Field of Search ............ 296/201, 79, 146.14, 296/107.07, 138, 145

(56) References Cited

U.S. PATENT DOCUMENTS

| | | | | |
|---|---|---|---|---|
| 3,970,343 A | * | 7/1976 | Horn | 296/222 |
| 5,339,584 A | * | 8/1994 | Ohtake et al. | 296/146.15 |
| 5,915,780 A | * | 6/1999 | Kobrehel et al. | 296/201 |
| 6,244,653 B1 | * | 6/2001 | Nishio et al. | 296/201 |

FOREIGN PATENT DOCUMENTS

| | | | |
|---|---|---|---|
| DE | 28 06 612 | 8/1979 | |
| DE | G 88 08 137.0 | 10/1988 | |
| DE | 196 28 107 C1 | 2/1998 | |
| DE | 196 42 648 A1 | 4/1998 | |
| DE | 197 24 592 C1 | 10/1998 | |
| EP | 0 284 931 A1 | 10/1988 | |
| EP | 0 294 128 A2 | 12/1988 | |
| FR | 002684051 | * 5/1993 | 296/201 |
| JP | 0240424 | * 10/1988 | 296/201 |

* cited by examiner

Primary Examiner—Joseph D. Pape
Assistant Examiner—Hilary Gutman
(74) Attorney, Agent, or Firm—Nixon Peabody LLP; David S. Safran

(57) ABSTRACT

A convertible top of a motor vehicle with a convertible top fabric and a plastic window which is located in a cut-out of the fabric of the top. In an edge area (4) of the window (2), either an edge (3) of the fabric (1) of the convertible top bordering the cut-out or an attachment means which is connected to the fabric (1) of the convertible top is securely molded in. The window (2) can be produced in a casting or injection molding process and in this production process the edge (3) of the fabric or the attachment means is embedded in the window during its manufacture.

24 Claims, 4 Drawing Sheets

CONVERTIBLE TOP OF A MOTOR VEHICLE

BACKGROUND OF THE INVENTION

1. Field of the Invention

The invention relates to a convertible top of a motor vehicle with convertible top fabric and a plastic window which is located in a cut-out of the fabric of the top.

2. Description of Related Art

German Patent DE 197 24 592 C1 discloses a convertible top for a motor vehicle in which a first convertible top surface element is connected by means of a strip-shaped PUR (polyurethane resin) cast resin element to a second convertible top element which, in one embodiment, is a convertible top window or a rear window. The two convertible top surface elements can be connected to one another, according to one embodiment, using a fabric or braided strip which is sewn or cemented to the edges of the two convertible top surface elements.

SUMMARY OF THE INVENTION

The object of the invention is to devise the initially mentioned convertible top in which the plastic window can be attached to the fabric of the convertible top with little installation effort.

In accordance with the invention, this object is achieved in the aforementioned convertible top in that an edge of the fabric of the convertible top bordering the cut-out or an attachment means connected to the fabric of the convertible top is securely molded-in in an edge area of the window. In this connection, thus, an intimate, solid and tight attachment of the convertible top fabric in the plastic material of the window is achieved between the convertible top and the window, in contrast to the known window fastenings in which the window is cemented to the convertible top fabric or is connected via a connecting part which is additionally injected onto the existing window.

While in these known window attachments at least one additional working process is necessary, this additional working process is eliminated with the convertible top proposed in accordance with the present invention in which the window is produced from a clear plastic, preferably, in a casting or injection molding process. In the production of the window, the edge of the convertible top fabric which has been cut to size for the cut-out is inserted into the casting mold such that the plastic is cast or injected around the fabric edge so that the plastic holds the edge tight and fast. By means of this securely encompassing embedding of the fabric edge in the material of the window, it is enough if only a comparatively narrow fabric edge is embedded, by which a larger viewing area through the window is achieved as compared to conventional window attachments.

Since the embedded convertible top fabric can be curved directly around the edge or the outside edge of the window, less storage space is needed for the window when the convertible top is being opened and when the window is being stowed. By means of a correspondingly configured rounded outside edge of the window, favorable buckling behavior of the convertible top fabric on its embedding or peripheral casting in the window arises. These statements also apply to an alternative embodiment in which an attachment means connected to the convertible top fabric is securely molded in.

This type of attachment is suitable both for solid and also flexible plastic windows of a convertible top, especially for a rear window, and the convertible top can be, for example, the folding roof of a convertible or also a solid fabric convertible top.

Feasibly, the edge section of the window is thickened so that, regardless of the window thickness, sufficient anchoring and embedding of the convertible top fabric or the attachment means or also of an additional attachment or insertion part are possible.

Preferably, the thickened area on the edge section of the window is formed on a side facing toward the inside of the window, but can also be formed facing toward the outside of the window or on both sides. In doing so, the edge of the fabric can be embedded in the edge area of the window such that the convertible top fabric is located flush to the outside of the window, above the outside of the window or set back from the outside of the window.

If in the edge area of the window a reinforcing frame is embedded, a thin window acquires greater stiffness.

Feasibly, in the edge area of the window at least one insertion part which projects out of the edge area can be embedded, to which another mechanism part of the convertible top can be attached. Instead of one or more individual insertion parts, this a frame-shaped part can be used.

Preferably, the attachment means is a zipper closure, one half of which is embedded in the window and the other half of which is connected to the fabric of the convertible top. In this way, the window can be replaced without major effort.

One alternative embodiment calls for the attachment means to be a frame, especially a fabric frame to which a zipper is attached.

The window can be produced from a 2-component injection molding which had two different components or materials. Thus, on the window, areas with different properties such as, for example, different colors, especially in the edge area, can be produced. On the other hand, the 2-component injection molding can also contain two identical components or materials with different colors.

In the following, embodiments of the invention are explained with reference to the drawings.

DETAILED DESCRIPTION OF THE INVENTION

Figure 1:
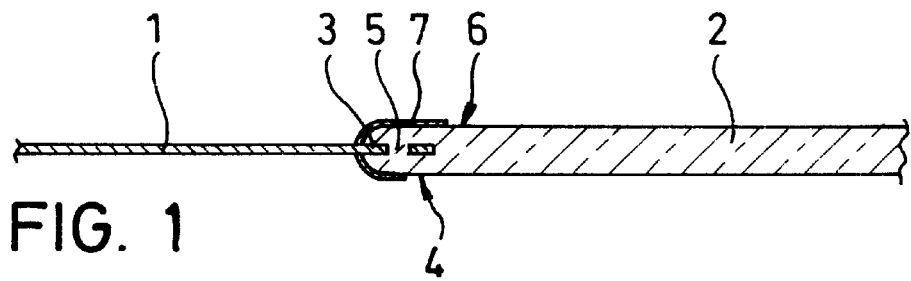
FIGS. 1 to 9 each show a sectional view of the edge area of a respective embodiment of a convertible top in which the fabric of the convertible top is embedded securely into the window of the convertible top.

A folding convertible top for a convertible comprises a fabric 1 of the convertible top and a plastic window 2 which is, for example, the rear window. The window 2 is located in a cutout in the fabric 1 which is matched to the outline of the window 2 of the convertible top. In the production of the window 2, the edge 3 of the fabric 1 bordering the cut-out of the convertible top is inserted into a casting or injection mold such that the fabric edge 3 is cast or molded into the edge area 4 of the window 2 and is held securely surrounded by the plastic material of the window 2. In this way, a permanent and tight connection of the window 2 to the fabric 1 of the convertible top is formed. In the embodiment shown in FIG. 1, for example, holes 5 are punched out along the fabric edge 3 into which the plastic material of the window 2 penetrates, yielding increased strength to the connection. The fabric edge 3 is embedded roughly in the middle plane of the window 2 which is, for example, a comparatively thick and rigid hard plastic window, so that the outside 6 of the window 2 (the top side as shown in FIG. 1) with the convertible top closed is elevated relative to the fabric 1 of the convertible top ("overflush"). When the convertible top is being opened, the fabric 1 of the convertible top can be bent directly on the edge area 4 of the window 2 which can be made rounded if the folding of the convertible top provides for this. On the outside of the window 6, over the area of the edge 3 of the fabric 1, a cover 7 can be applied, for example, a black coating or an overprint in order to optically cover the embedded fabric edge 3.

Figure 2:
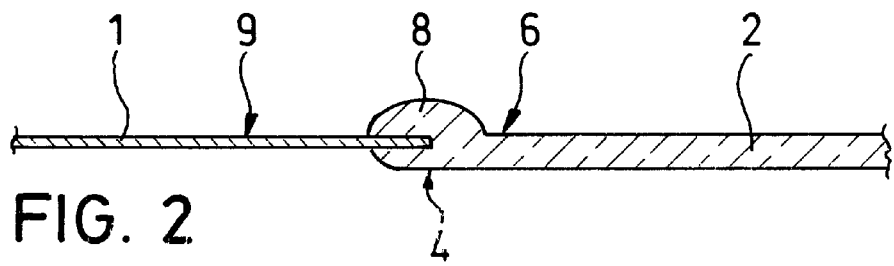

The window 2, which is shown in FIG. 2 contains a frame-like, peripheral thickened area 8 on one side, being formed on the outside 6 of the window 2 in the area of its edge area 4. The fabric edge 3 is embedded in the edge area 4 of the window 2 such that the top 9 of the fabric is located roughly at the height of the outside 6 of the window ("flush"). This arrangement of the fabric edge 3 can also be used for thinner windows 2.

Figure 3:
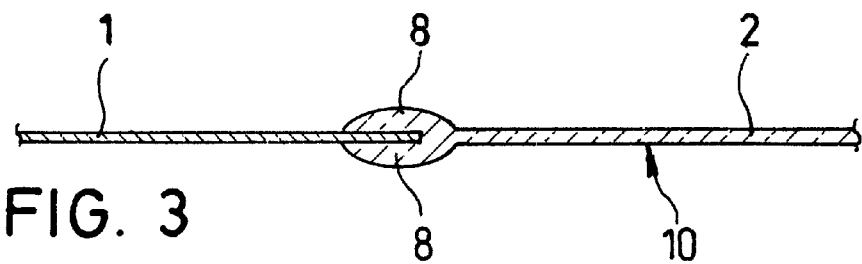

FIG. 3 shows a thinner, soft window 2 in which the thickened area 8 on the edge area 4 is made on both sides, i.e., both toward the outer side 6 of the window and also toward the inside 10 of the window. The thickened area 8 can be made either symmetrical or with bulges of different thickness on each side.

Figure 4:
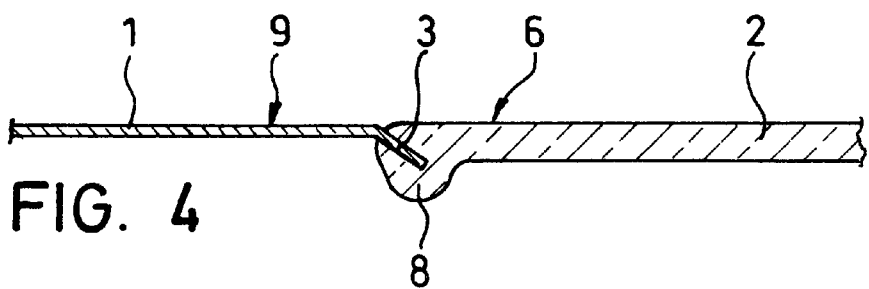

The window 2 which is shown in FIG. 4 contains a frame-like thickened area 8 which is made on the inside and in which the fabric edge 3 is embedded at an angle running from the edge of the fabric toward the outer side 6 of the window such that the top 9 of the fabric ends flush with the outer side 6 of the window.

Figure 5:
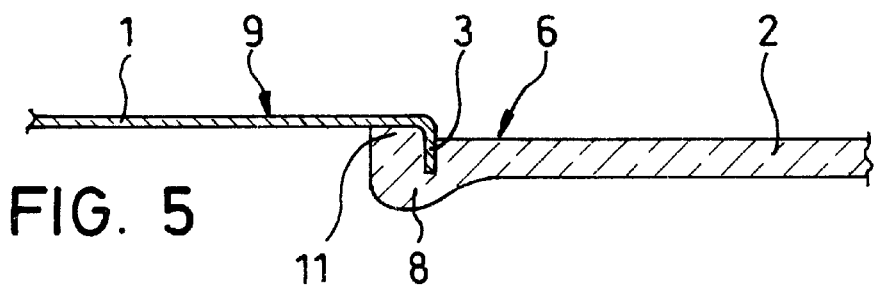

The window 2 shown in FIG. 5 contains an edge area 4 with an inside thickened area 8 and a flat elevation 11 which projects beyond the outer side 6 of the window. The fabric edge 3 is embedded extending into the window behind the elevation 11, roughly normal to the outer side 6 of the window in the thickened area 8 so that the fabric 1 of the convertible top adjoins the elevation 11 (outside 6 of the window towards the top 9 of the fabric "underflush"). A comparable attachment of the fabric edge 3 is also possible for a thickened area 8 which is formed without an elevation.

Figure 6:
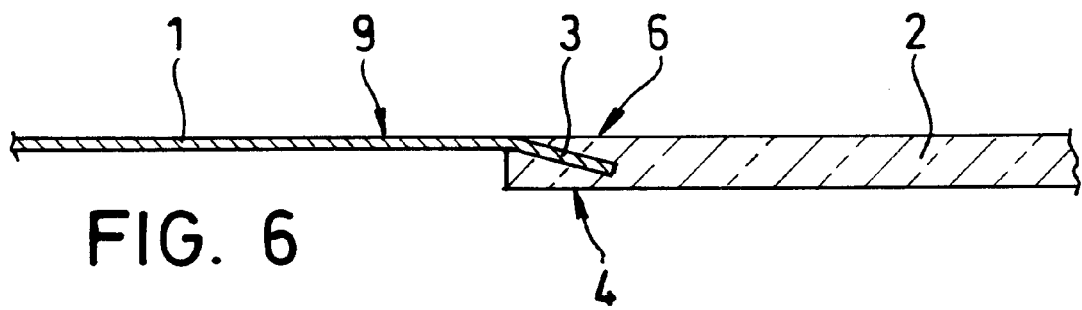

In the window 2 shown in FIG. 6 the fabric edge 3, similar to the example of FIG. 4, is embedded in the edge area 4 at an angle; but, the fabric edge 3 extends at a flatter angle into an unthickened edge area 4 of the window 2. The top 9 of the fabric ends flush with the outer side 6 of the window.

Figure 7:
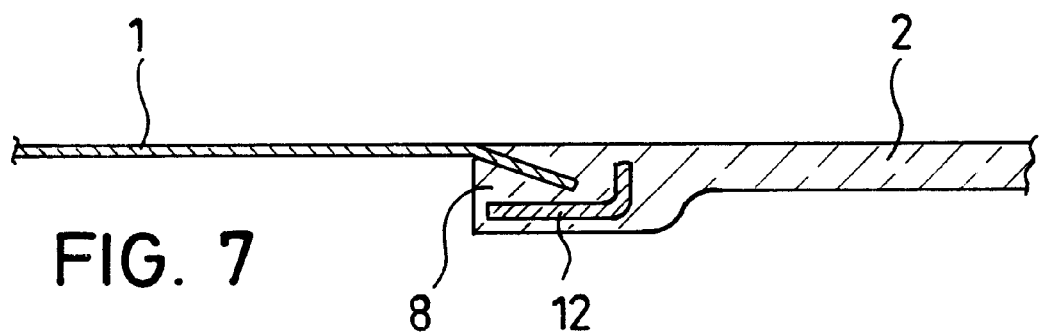

The window 2 shown in FIG. 7 contains an edge area 4 with an inside thickened area 8 and a reinforcing frame 12 which is completely embedded in the thickened area 8 and which is, for example, an aluminum section. The fabric edge 3 is embedded in the window 2 comparably to the example shown in FIG. 6.

Figure 8:
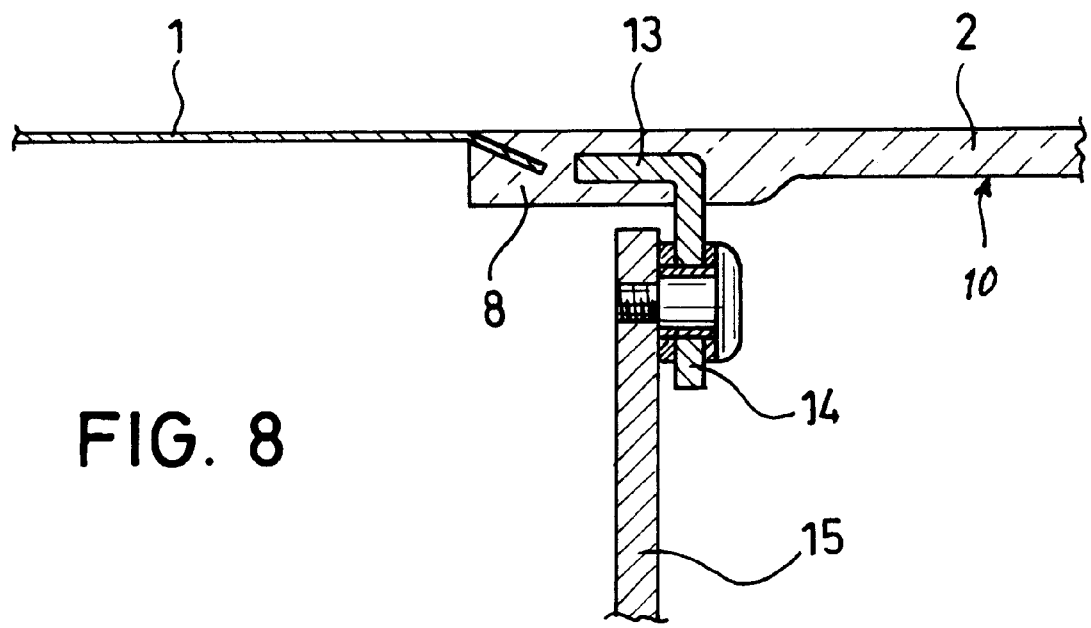

In the embodiment shown in FIG. 8, an insertion part 13 is anchored in the inwardly thickened area 8. Insertion part 13 contains an attachment section 14 which projects inwardly from the inside 10 of the window. Mechanism parts of the convertible top such as, for example, a hinge 15, can be attached to this attachment section 14.

Figure 9:
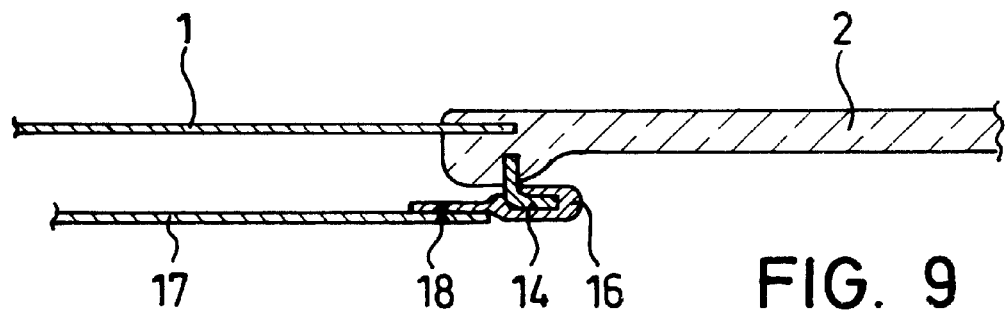

FIG. 9 shows an embodiment in which the window 2 has an inwardly thickened area 8 in which a frame-like attachment section 14 is anchored, to which is attached a profile part 16 which is shaped to match the insertion part 14 and which, in turn, is connected, for example, by stitching 18 to another convertible top part such as, for example, an inside headlining 17. Instead of the frame-like attachment section 14, also several individual attachment sections 14 can be anchored in the thickened area 8.

The above described embodiments can be made both with rigid windows (for example, of polycarbonate) and also with flexible windows (for example, of transparent soft PVC), and in different combinations of one-sided and two-sided thickened areas and different embedding of the fabric edge 3.

Figure 10:
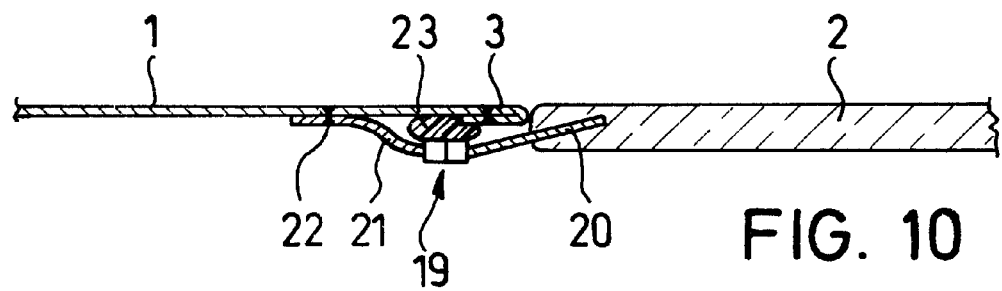
FIGS. 10 to 15 each show a sectional view of the edge area of a respective embodiment of a convertible top in which an attachment means is embedded in the window pane of the convertible top, with the fabric of the convertible top being fixed on the attachment means.

In the following embodiments, it is not the fabric 1 of the convertible top which is embedded into the window 2, but an attachment means 19 to which the fabric 1 of the convertible top, in turn, is attached directly or indirectly. The attachment means 19 is, for example, a zipper (see FIG. 10) with one half 20 of the zipper embedded in the window 2 and with the other half 21 connected by stitching 22 to the fabric 1 of the convertible top. The fabric edge 3 is turned down and sewn. A seal 23 is inserted between the fabric 1 of the convertible top and the zipper seals the zipper 20, 21. This configuration makes it possible to replace the window 2 without major installation effort.

Figure 11:
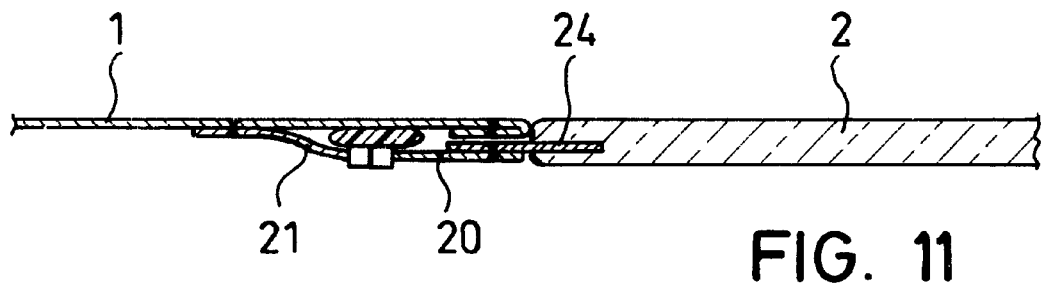

In the embodiment of FIG. 11 a fabric frame 24 is embedded in the window as the attachment means, and to which, in turn, one half of the zipper is attached. Otherwise, this embodiment is equivalent to the embodiment which is described in FIG. 10.

Figure 12:
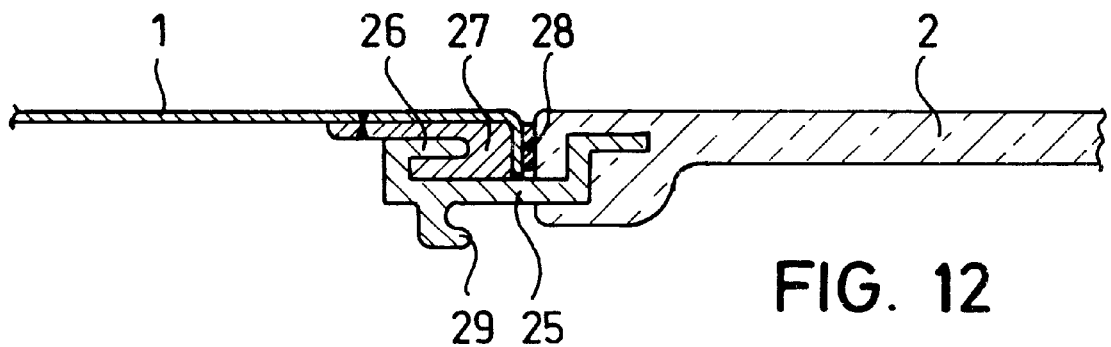

In the embodiment of FIG. 12, a frame such as, for example, an aluminum section 25 is embedded in the window 2 as an attachment means. On one free leg 26 of the aluminum section 25, a section 27 of weatherstripping is detachably mounted, to which, in turn, the fabric 1 of the convertible top is securely attached. A seal 28 is inserted into the gap between the inwardly curved fabric edge 3 and the thickened area 8 of the window 2. On the aluminum section 25, a hook-shaped projection 29 can be formed to which an inside head lining (not shown) can be attached.

Figure 13:
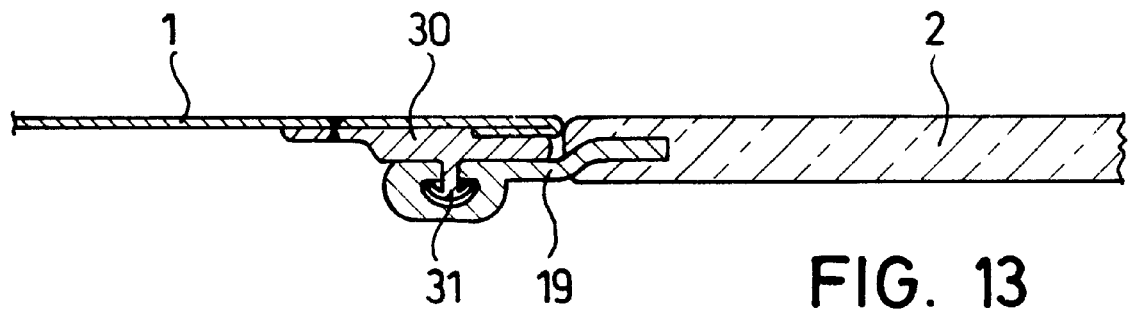

A similar embodiment is shown in FIG. 13. Here, a profile element 30 is attached to the fabric 1 of the convertible top which has, for example, mushroom-like clips 31 for detachable engagement to an attachment means 19 which is made as a frame and which is anchored in the window 2.

Figure 14:
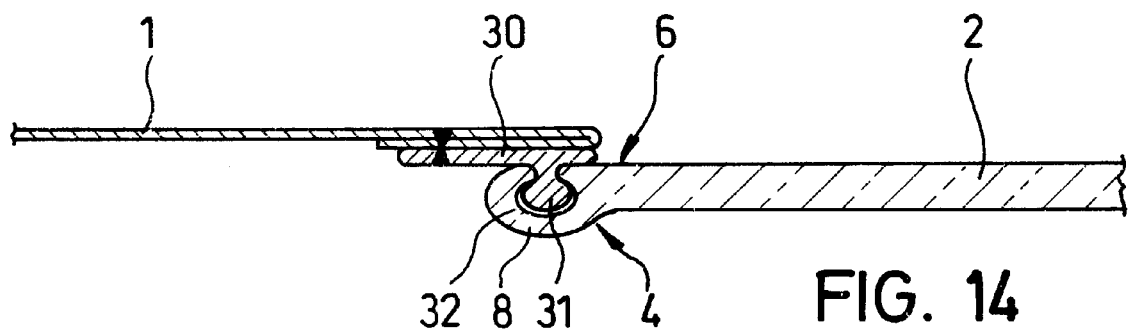

FIG. 14 shows a window 2 which on its edge section 4 has a thickened area 8 with a trough-like recess 32 which is open towards the outer side 6 of the window, which has an undercut and which is molded in when the window 2 is cast or is produced subsequently, for example, by milling. Clips 31 of a profile element 30 are pressed into the recess 32.

Figure 15:
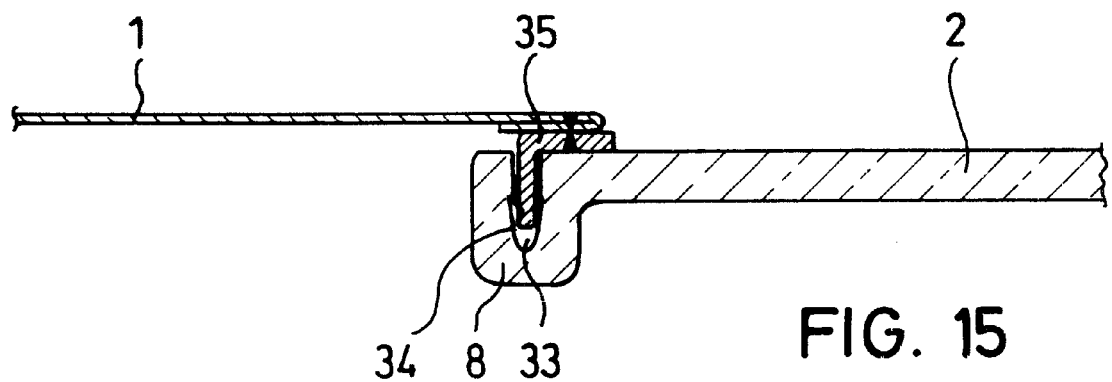

Finally, FIG. 15 shows a window 2 with an inside thickened area 8 which has an opening 33 which faces outwardly and is in the form of individual holes or a continuous slot. A spring sheet metal clamp 34 of an angle section strip 35 is detachably inserted into this opening 33 and the fabric 1 of the convertible top is attached to the strip.

What is claimed is:

1. Convertible top of a motor vehicle comprising convertible top fabric and a plastic window formed of a plastic material, the window being located in a cut-out of the top fabric, wherein one of an attachment means for attachment of an edge of the fabric of the convertible top to an edge area of the window and the edge of the fabric bordering the cut-out is securely molded into the plastic material of which the window is formed.

2. Convertible top as claimed in claim 1, wherein the window is one of a casting and an injection molded part; and wherein said one of the edge of the fabric and the attachment means is embedded in the window during manufacture said one of a casting and an injection molded part.

3. Convertible top as claimed in claim 1, wherein the window is a rear window.

4. Convertible top as claimed in claim 1, wherein the edge area of the window has a thickened area.

5. Convertible top as claimed in claim 4, wherein the thickened area on the edge area of the window is on only an inner side of the window.

6. Convertible top as claimed in claim 4, wherein the thickened area on the edge area of the window is on only an outer side of the window.

7. Convertible top as claimed in claim 4, wherein the thickened area on the edge area of the window is formed on both sides of the window.

8. Convertible top as claimed in claim 1, wherein the edge of the fabric is embedded in the edge area of the window with the fabric of the convertible top being level with an outer side of the window.

9. Convertible top as claimed in claim 1, wherein the edge of the fabric is embedded in the edge area of the window with the fabric of the convertible top being below an outer side of the window.

10. Convertible top as claimed in claim 1, wherein the edge of the fabric is embedded in the edge area of the window with the fabric of the convertible top being above an outer side of the window.

11. Convertible top as claimed in claim 1, wherein a reinforcing frame is embedded in the edge area of the window.

12. Convertible top as claimed in claim 1, wherein at least one insertion part which projects out of the edge area is embedded in the edge area of the window.

13. Convertible top as claimed in claim 12, wherein the insertion part is in the form of a frame.

14. Convertible top as claimed in claim 1, wherein the attachment means is a zipper, one half of which is embedded in the window and the other half of which is connected to the fabric of the convertible top.

15. Convertible top as claimed in claim 1, wherein the attachment means is a frame.

16. Convertible top as claimed in claim 15, wherein the frame is a fabric frame to which a zipper is attached.

17. Convertible top as claimed in claim 15, wherein the frame is a metal frame to which the fabric of the convertible top is attached.

18. Convertible top as claimed in claim 17, wherein the fabric of the convertible top is attached to a section of weatherstripping which is attached to the attachment means.

19. Convertible top as claimed in claim 1, wherein the fabric of the convertible top is attached to a profile element which contains an attachment clip which is fixable on the attachment means.

20. Convertible top as claimed in claim 19, wherein the edge section of the window has a trough-shaped recess for holding the attachment clip.

21. Convertible top as claimed in claim 19, wherein the trough-shaped recess for holding the attachment clip has an undercut configuration.

22. Convertible top as claimed in claim 1, wherein the window comprises a 2-component injection molding, the components of which are made of different materials.

23. Convertible top as claimed in claim 1, wherein the window comprises a 2-component injection molding, the components of which are made of identical materials with different colors.

24. Convertible top as claimed in claim 1, wherein the convertible top is a folding roof of a convertible.

* * * * *